United States Patent
Nakano et al.

(12)

(10) Patent No.: US 7,753,514 B2
(45) Date of Patent: Jul. 13, 2010

(54) ULTRAVIOLET CURING TYPE INK COMPOSITION AND IMAGING PROCESS FOR USING THE SAME

(75) Inventors: Keitaro Nakano, Nagano (JP); Takashi Oyanagi, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 163 days.

(21) Appl. No.: 11/238,830

(22) Filed: Sep. 29, 2005

(65) Prior Publication Data

US 2006/0158493 A1     Jul. 20, 2006

(30) Foreign Application Priority Data

| Sep. 30, 2004 | (JP) | ............................ P.2004-286866 |
| Dec. 21, 2004 | (JP) | ............................ P.2004-370203 |
| Sep. 28, 2005 | (JP) | ............................ P.2005-281679 |

(51) Int. Cl.
    *C09D 11/00* (2006.01)
(52) U.S. Cl. ..................... 347/100; 106/31.13
(58) Field of Classification Search ................. 347/100; 106/31.13
    See application file for complete search history.

(56) References Cited

U.S. PATENT DOCUMENTS

| 5,623,001 A | 4/1997 | Figov |
| 5,663,211 A * | 9/1997 | Kominami et al. .............. 522/8 |
| 6,511,156 B1 * | 1/2003 | Kazama et al. ................ 347/47 |
| 6,550,905 B1 * | 4/2003 | Deckers ........................ 347/100 |
| 2002/0067394 A1 * | 6/2002 | Yoshihiro et al. ............. 347/45 |
| 2004/0021753 A1 * | 2/2004 | Yoshihiro et al. ............ 347/100 |
| 2004/0099170 A1 * | 5/2004 | Takabayashi ................ 101/491 |

FOREIGN PATENT DOCUMENTS

| JP | 03-216379 | 9/1991 |
| JP | 2003-260790 | 9/2003 |
| JP | 2003-292855 | 10/2003 |
| JP | 2003292855 A * | 10/2003 |
| JP | 2004-175906 | 6/2004 |
| JP | 2004244624 A * | 9/2004 |

OTHER PUBLICATIONS

Computer-Generated English Translation of Claims and Specification and Patent Abstracts of Japan of JP 2004-175906 dated Jun. 24, 2004.
Computer-Generated English Translation of Claims and Specification and Patent Abstracts of Japan of JP 2003-292855 dated Oct. 15, 2003.
Computer-Generated English Translation of Claims and Specification and Patent Abstracts of Japan of JP 2003-260790 dated Sep. 16, 2003.
Patent Abstracts of Japan of JP 03-216379 dated Sep. 24, 1991.

* cited by examiner

*Primary Examiner*—Laura E Martin
(74) *Attorney, Agent, or Firm*—Ladas & Parry LLP

(57) ABSTRACT

The present invention relates to an ink composition containing a monofunctional monomer at a mixing ratio of 50 to 70% by weight, a bifunctional monomer at a mixing ratio of 10 to 30% by weight and a multifunctional monomer at a mixing ratio of 1 to 10% by weight. According to the invention, there is provided an ultraviolet curing type ink composition which is curable with an ultraviolet ray, high in its curing (polymerization) rate, and low in viscosity and toxicity. Further, an imaging process using the above-mentioned ink composition is also disclosed.

13 Claims, No Drawings

ULTRAVIOLET CURING TYPE INK COMPOSITION AND IMAGING PROCESS FOR USING THE SAME

FIELD OF THE INVENTION

The present invention relates to an ink composition and an imaging process using the same, and particularly, to an ultraviolet curing type ink composition which is curable with an ultraviolet ray, high in its curing (polymerization) rate, low in viscosity and low in toxicity and an imaging process using the same.

BACKGROUND OF THE INVENTION

An ink jet recording method is a printing method of ejecting a droplet of an ink composition to attach it onto a recording medium such as paper, thereby performing printing. This ink jet recording method is characterized by that images having high resolution and high quality can be printed at high speed. The ink composition used in the ink jet recording method is generally one mainly composed of an aqueous solvent and containing a coloring material component and a wetting agent such as glycerin for the purpose of preventing clogging.

Further, when printing is performed on paper or cloth into which the aqueous ink composition is difficult to penetrate, or a material such as metal or plastic into which the aqueous ink composition does not penetrate, for example, a recording medium such as a plate or a film made of a resin such as a phenol resin, a melamine resin, a vinyl chloride resin, an acrylic resin or a polycarbonate resin, the ink composition is required to contain a component which can allow the coloring material to be stably firmly fixed to the recording medium. In particular, when printing is performed on a print wiring substrate or the like, quick drying properties and chemical resistance are demanded for the ink composition.

To such a demand, an ink composition comprising a component polymerizable by ultraviolet irradiation has hitherto been proposed (for example, see patent document 1). Further, an ultraviolet curing type ink composition comprising a coloring material, an ultraviolet curing agent, photopolymerization initiator and the like has been proposed (for example, see patent document 2). According these ink compositions and ink jet recording methods, it is said that blurring of the ink composition on the recording medium can be prevented to improve image quality.

In the ink jet recording method using the ink composition comprising the component polymerizable by ultraviolet irradiation as described above, an ultraviolet lay is irradiated after the ink composition has been adhered to the recording medium. Thereupon, the photopolymerization initiator in the ink composition forms radicals and the like, thereby initiating polymerization of an oligomer and a monomer, followed by curing. Accordingly, the coloring material in the ink composition is firmly fixed onto the recording medium. This firm fixing is considered to be able to realize printing which is high in film strength, solvent resistance and color density and has decreased blurring and unevenness.

It has been known that monomers used in the conventional ultraviolet curing inks generally have the characteristics that one having high curability is high in the primary irritation index (PII) and one having low PII is also low in curability. Accordingly, in the conventional ultraviolet curing ink compositions, materials having a PII of 5 or more are used as raw materials in many cases in order to enhance the rate of polymerization, and attention is required for handling thereof. An equipment burden such as the use of a local exhaust system is necessary in use, and this has been unfavorable.

Further, the rate of polymerization by ultraviolet curing generally tends to increase as the molecular weight of a monomer used decreases.

From the relationship between the high and low of the above-mentioned PII and the high and low of curability (rate) and the relationship between the high and low of the rate of ultraviolet curing polymerization and the high and low of the molecular weight of the monomer used (in the case of similar structures), the lower the molecular weight of the monomer used, the higher the rate of polymerization, but the PII is also high. The higher the molecular weight of the monomer used, the lower the PII, but the rate of polymerization is also low, and further, the viscosity also becomes high (for example, in order to decrease the PII, a methacrylate monomer is more effective than an acrylate monomer, but the rate of polymerization decrease, and further, the viscosity becomes high).

Furthermore, it is also advantageous to use a multifunctional monomer as a measure for improving the low PII and the rate of polymerization, but the viscosity becomes high. In order to decrease the viscosity of the high-viscosity ink composition, an organic solvent (VOC) which is high in volatility (evaporates at ordinary temperature) is forced to be used in large amounts. This has not been favorable also from the viewpoint of the environment.

Patent Document 1: JP-A-3-216379

Patent Document 2: U.S. Pat. No. 5,623,001

As described above, various attempts have been made to the demands for decreasing the PII, improving the rate of polymerization and decreasing the viscosity. However, development of an ink composition which meets all "the high rate of polymerization, the low PII value and the low viscosity" has not been achieved.

SUMMARY OF THE INVENTION

Accordingly, the invention has been made in order to solve the above-mentioned problems, and an object of the invention is to provide an ultraviolet curing type ink composition which is high in the rate of curing (polymerization), low in viscosity and low in toxicity.

Other objects and effects of the invention will become apparent from the following description.

The present inventors have made intensive studies. As a result, the above-mentioned objects have been achieved by employing the following constitution, thus completing the invention.

That is to say, the invention is as follows:

(1) An ink composition containing a monofunctional monomer at a mixing ratio of 50 to 70% by weight, a bifunctional monomer at a mixing ratio of 10 to 30% by weight and a multifunctional monomer at a mixing ratio of 1 to 10% by weight;

(2) The ink composition of the above (1), wherein the composition further contains a coloring material;

(3) The ink composition of the above (1), wherein the above-mentioned monofunctional monomer, bifunctional monomer and multifunctional monomer each have a PII value of 2 or less;

(4) The ink composition of the above (1), wherein the composition has a viscosity of 10 mPa·s or less at 25° C.;

(5) The ink composition of the above (1), wherein the composition is solventless;

(6) The ink composition of the above (1), wherein the monofunctional monomer is one or two or more selected from N-vinylformamide, acryloyl morpholine, phenoxyethyl acrylate and isobonyl acrylate;

(7) The ink composition of the above (6), wherein the composition contains at least N-vinylformamide as the monofunctional monomer; and (8) An imaging process comprising ejecting a droplet of the ink composition of any one of the above (1) to (7) to attach it onto a recording medium, and then, conducting ultraviolet irradiation with an ultraviolet light emitting diode.

Usually, when a monofunctional monomer having a PII of 2 or less is used in the ink composition, taking safety and environment into consideration, it becomes possible to design the viscosity to be low. However, the rate of polymerization becomes slow, so that a long time is taken until cured, and there is the problem that a cured surface is roughened by curing contraction. Further, it becomes possible to shorten the curing time by using a bifunctional monomer or a multifunctional monomer together. However, the viscosity increases with an increase in its amount, so that printing becomes impossible in an ink jet printer.

On the contrary, in the ink composition of the invention, the mixing ratios of the monofunctional monomer, the bifunctional monomer and the multifunctional monomer were adjusted to 50 to 70% by weight, 10 to 30% by weight and 1 to 10% by weight, respectively, thereby being able to achieve the low viscosity and the high rate of polymerization.

Further, N-vinylformamide (NVF) was used as the monofunctional monomer, thereby being able to achieve the low toxicity, the low viscosity and the high rate of polymerization more surely.

Furthermore, according to the ultraviolet curing type ink composition of the invention, image formation is possible using an ultraviolet light emitting diode, in addition to a mercury lamp generally used as an ultraviolet irradiation source. It has therefore extremely high practicability.

DETAILED DESCRIPTION OF THE INVENTION

The ink composition of the invention and the image formation process using the same will be described in detail below.

The ink composition according to the invention is characterized in that composition contains a monofunctional monomer at a mixing ratio of 50 to 70% by weight, a bifunctional monomer at a mixing ratio of 10 to 30% by weight and a multifunctional monomer at a mixing ratio of 1 to 10% by weight.

As the monomers, there can be used all the monofunctional monomer, the bifunctional monomer and the multifunctional monomer. However, it is preferred that all monomers have a PII value of 2 or less.

The monofunctional monomers, bifunctional monomers and multifunctional monomers having a PII value of 2 or less which can be used in the ink composition of the invention are exemplified in Table 1 shown below.

TABLE 1

| Material Name | Viscosity (mPa·s) | P.I.I. |
|---|---|---|
| *Monofunctional Monomer* | | |
| N-Vinylformamide (Beamset 770, Arakawa Chemical Industries Ltd.) | 4.3 | 0.4 |
| (2-Methyl-2-ethyl-1,3-dioxolane-4-yl)methyl acrylate (MEDOL-10, Osaka Organic Chemical Industry Ltd.) | 5.1 | 1.3 |
| (2-Methyl-2-isobutyl-1,3-dioxolane-4-yl)methyl acrylate (MIBDOL-10, Osaka Organic Chemical Industry Ltd.) | 5.3 | 1.0 |
| Phenoxyethyl acrylate (Viscoat #192, Osaka Organic Chemical Industry Ltd.) | 3.3 | 1.7 |
| Isobonyl acrylate (IBXA, Osaka Organic Chemical Industry Ltd.) | 2.6 | 0.6 |
| Methoxydiethylene glycol monoacrylate (Blenmer PME-100, NOF Corporation) | 2 | 0.7 |
| Acryloyl morpholine (ACMO, Kohjin Co., Ltd.) | 12 | 0.5 |
| *Bifunctional Monomer* | | |
| Ethylene glycol dimethacrylate (Light Ester EG, Kyoeisha Chemical Co., Ltd) | 3 | 0.6 |
| Diethylene glycol dimethacrylate (Light Ester 2EG, Kyoeisha Chemical Co., Ltd) | 5 | 0.5 |
| Tripropylene glycol diacrylate (Aronix M-220, Toagosei Co., Ltd) | 12 | 1.6 |
| 1,9-Nonanediol diacrylate (Viscoat #260, Osaka Organic Chemical Industry Ltd.) | 21 | 2.0 |
| Polyethylene glycol #400 diacrylate (NK Ester A400, Shin-Nakamura Chemical Co., Ltd.) | 58 | 0.4 |
| Tetraethylene glycol dimethacrylate (NK Ester 4G, Shin-Nakamura Chemical Co., Ltd.) | 14 | 0.5 |
| 1,6-Hexanediol dimethacrylate (NK Ester HD-N, Shin-Nakamura Chemical Co., Ltd.) | 6 | 0.5 |
| Neopentyl glycol dimethacrylate (NK Ester NPG, Shin-Nakamura Chemical Co., Ltd.) | 7 | 0.0 |
| 2-Hydroxy-1,3-dimethacryloxypropane (NK Ester 701, Shin-Nakamura Chemical Co., Ltd.) | 37 | 0.6 |
| *Multifunctional Monomer* | | |
| Trimethylolpropane trimethacrylate (NK Ester TMPT, Shin-Nakamura Chemical Co., Ltd.) | 42 | 0.8 |
| Trimethylolpropane EO adduct triacrylate (Viscoat #360, Osaka Organic Chemical Industry Ltd.) | 55 | 1.5 |
| Trimethylolpropane PO adduct triacrylate (New Frontier TMP-3P, Dai-Ichi Kogyo Seiyaku Co., Ltd.) | 60 | 0.1 |
| Glycerin PO Adduct triacrylate (Viscoat #GPT, Osaka Organic Chemical Industry Ltd.) | 55 | 1.5 |

The viscosity in the above-mentioned table is a measured value at 25° C.

Preferred examples of the monofunctional monomers are N-vinylformamide, phenoxyethyl acrylate, isobonyl acrylate and acryloyl morpholine. Of these, more preferred are N-vinylformamide, phenoxyethyl acrylate and isobonyl acrylate, and still more preferred is N-vinylformamide.

The monofunctional monomers, bifunctional monomers and multifunctional monomers used in the ink composition of the invention may each be used either alone or as a combination of two or more of them.

The photopolymerization initiator contained in the ink composition of the invention is one which absorbs a ultraviolet ray, for example, in the region of about 250 nm to 450 nm to form radicals or ions, thereby initiating polymerization of the above-mentioned monomer.

Typical examples of the photopolymerization initiators used in the invention include benzoin methyl ether, benzoin ethyl ether, isopropyl benzoin ether, isobutyl benzoin ether, 1-phenyl-1,2-propanedione-2-(o-ethoxycarbonyl)oxime, benzyl, diethoxyacetophenone, benzophenone, chlorothioxantone, 2-chlorothioxantone, isopropylthioxantone, 2-methylthioxantone, polychlorinated polyphenyl, hexachlorobenzene and the like, and preferred are isobutyl benzoin ether and 1-phenyl-1,2-propanedione-2-(o-ethoxycarbonyl)oxime.

Further, there can also be used photopolymerization initiators available under the trade names of Vicure 10, 30 (manufactured by Stauffer Chemical), Irgacure 184, 651, 2959, 907, 369, 1700, 1800, 1850, 819, Darocure 1173 (manufactured by Ciba Specialty Chemicals), Quantacure CTX, ITX (manufactured by Aceto Chemical) and Lucrin TPO (manufactured by BASF).

Furthermore, the ink composition of the invention may contain an oligomer as a polymerizable compound, in addition to the above-mentioned monomers.

The oligomer which can be used in the ink composition of the invention means a molecule having a medium-sized relative molecular mass and having a structure constituted by few repetitions, generally about 2 to 20 repetitions, of a unit substantially or conceptually obtained from a molecule having a small relative molecular mass. Further, the oligomer used in the invention is one called a photopolymerizable prepolymer, base resin or an acrylic oligomer.

The oligomer has one to several acryloyl groups as functional groups, so that it has the property of inducing a polymerization reaction with the monomer or the like by ultraviolet irradiation or the like to perform crosslinking and polymerization.

The oligomers used in the invention include a polyester acrylate, a polyurethane acrylate, an epoxy acrylate, a polyether acrylate, an oligo acrylate, an alkyd acrylate, a polyol acrylate and the like, and preferred are a polyester acrylate and a polyurethane acrylate.

As the oligomer used in the invention, there is used one having a molecular weight ranging from about 5,000 to 20,000, preferably from about 500 to 10,000.

A polymerization accelerator may be contained in the ink composition of the invention.

Although not particularly limited, the polymerization accelerators contained in the ink composition of the invention include Darocur EHA, EDB (manufactured by Ciba Specialty Chemicals) and the like.

Further, the other polymerization accelerators include fine particles having a polymerizable functional group, and the like.

Although the operational mechanism of the polymerizable functional group-containing fine particles is not clear, it is presumed that they are contained in the ink composition, whereby a monomer component is adsorbed by surfaces of the fine particles, resulting in no escape of radicals generated by a polymerization initiator, so that the monomer adsorbed by the surfaces of the fine particles efficiently contributes to polymerization.

The polymerizable functional group-containing fine particles are not particularly limited, but they are generally ones called an extender pigment. Inorganic compounds such as silica, alumina, titania and calcium oxide are exemplified, and particularly, transparent ones such as silica and alumina can also be suitably used.

Further, the polymerizable functional group contained in the fine particles is not particularly limited, and an acryloyl group, a methacryloyl group and the like are exemplified. Furthermore, it is also possible to use a polymerizable functional group having one or more double bonds.

Although the size of the fine particles is not particularly limited, ones having a particle size of 10 to 100 nm are preferred.

Although a method for preparing the polymerizable functional group-containing fine particles is not particularly limited, examples thereof include a method of preparing fine silane-based particles having a large number of hydroxyl groups and the like by a sol-gel reaction of a silane compound such as a silanol, and allowing them to react with a compound which can impart polymerizable functional groups to the hydroxyl groups.

The content of the polymerizable functional group-containing fine particles in the ink composition of the invention is not particularly limited, and should be appropriately selected depending on the type of usage, conditions, the relationship between the viscosity and polymerizability of the ink composition, and the like. However, it is preferably 10% by mass or less, based on the total amount of the ink composition.

Further, when the ink composition of the invention is used as a colored ink, a necessary colorant is added. The colorant used in this case may be either a dye or a pigment. However, when the penetration of the coloring component in the ink composition is inhibited by an action such as insolubilization or thickening of the ink composition, the pigment dispersed in the ink is advantageous rather than the dye dissolved therein.

As the dyes used, there can be used various dyes which are generally used for ink jet recording, such as a direct dye, an acid dye, a food dye, a basic dye, a reactive dye, a disperse dye, a vat dye, a soluble vat dye and a reactive disperse dye.

As the pigments used, inorganic pigments and organic pigments can be used without particular limitation.

As the inorganic pigments, there can be used carbon blacks produced by known processes such as a contact process, a furnace process and a thermal process, in addition to titanium oxide and iron oxide. Further, as the organic pigments, there can be used azo pigments (including an azo lake, an insoluble azo pigment, a condensed azo pigment and a chelate azo pigment), polycyclic pigments (for example, a phthalocyanine pigment, a perylene pigment, a perynone pigment, an anthraquinone pigment, a quinacridone pigment, a dioxazine pigment, a thioindigo pigment, an isoindolinone pigment and a quinophthalone pigment), dye chelates (for example, a basic dye type chelate and acid dye type chelate), nitro pigments, nitroso pigments, aniline black and the like.

As specific examples of the pigments, the carbon blacks include No. 2300, No. 900, MCF 88, No. 33, No. 40, No. 45, No. 52, MA 7, MA 8, MA 100, No. 2200 and the like manufactured by Mitsubishi Chemical Corporation, Raven 5750, Raven 5250, Raven 5000, Raven 3500, Raven 1255, Raven 700 and the like manufactured by Columbian Carbon Co., Regal 400R, Regal 330R, Regal 660R, Mogul L, Mogul 700, Monarch 800, Monarch 880, Monarch 900, Monarch 1000, Monarch 1100, Monarch 1300, Monarch 1400 and the like manufactured by Cabot Corporation, Color Black FW1, Color Black FW2, Color Black FW2V, Color Black FW18, Color Black FW200, Color Black S150, Color Black S160, Color Black S170, Printex 35, Printex U, Printex V, Printex 140U, Special Black 6, Special Black 5, Special Black 4A, Special Black 4 and the like manufactured by Degussa AG.

The pigments used in a yellow ink include C.I. Pigment Yellow 1, 2, 3, 12, 13, 14, 16, 17, 73, 74, 75, 83, 93, 95, 97, 98, 109, 110, 114, 128, 129, 138, 150, 151, 154, 155, 180, 185 and the like.

Further, the pigments used in a magenta ink include C.I. Pigment Red 5, 7, 12, 48(Ca), 48(Mn), 57(Ca), 57:1, 112, 122, 123, 168, 184, 202, 209, C.I. Pigment Violet 19 and the like.

Furthermore, the pigments used in a cyan pigment include C.I. Pigment Blue 1, 2, 3, 15:3, 15:4, 60, 16 and 22.

As another component, a polymerization inhibitor can be added in an amount of 200 to 2,000 ppm, in order to enhance the keeping quality of the ink composition. The ultraviolet curing type ink is preferably heated to decrease the viscosity and ejected, so that the polymerization inhibitor is preferably added also in order to prevent head clogging due to thermal polymerization.

In addition to this, a surfactant, a leveling additive, a matte agent, and a polyester resin, a polyurethane resin, a vinyl resin, an acrylic resin, a rubber resin or a wax for adjusting film properties can be added as needed.

Further, in order to improve adhesion with a recording medium, it is also effective to add a very slight amount of an organic solvent. In this case, it is effective to add the solvent within the range in which no problem arises for solvent resistance and VOC, and the amount thereof is 5% or less, and preferably 3% or less. However, the ink composition of the invention is more preferably solventless.

Further, because of a light shielding effect caused by the ink colorant, as a means for preventing sensitivity, it is also possible to combine a cationic polymerizable monomer having a long initiator life with the initiator to prepare a radical-cation hybrid type curing ink.

Furthermore, the viscosity of the ink composition of the invention is preferably 10 mPa·s or less at 25° C. from the standpoint of use.

The ink composition of the invention can be applied to all well-known, commonly used image recording and printing methods. For example, it can be applied to the image recording and printing methods such as an ink jet method, an offset method, a gravure method and a thermal transfer method. In particular, the ink composition of the invention is suitable for ink jet recording.

In the ink jet recording method using the ink composition of the invention, the ink composition is adhered to the recording medium, and then, irradiated with ultraviolet light. The photopolymerization initiator generates radicals and the like by the irradiated ultraviolet light, whereby the monomer (also the oligomer, when the oligomer is contained) starts the polymerization reaction, and the ink composition is firmly fixed to the recording medium. It is conceivable that printing which is clear and excellent in film strength and chemical resistance can be performed thereby also on a surface of a material such as metal or plastic into which an aqueous medium is impossible to penetrate.

According to a preferred embodiment of the invention, when ultraviolet irradiation is performed, the ultraviolet dose is 100 mJ/cm$^2$ or higher, preferably 500 mJ/cm$^2$ or higher, and is 10,000 mJ/cm$^2$ or lower, preferably 5,000 mJ/cm$^2$ or lower. The ultraviolet dose within such a range is advantageous, because it can achieve a sufficient curing reaction, and prevent fading of the coloring agent caused by ultraviolet irradiation.

Light sources for ultraviolet irradiation include lamps such as a metal halide lamp, a xenon lamp, a carbon arc lamp, a chemical lamp, a low-pressure mercury lamp and a high-pressure mercury lamp. For example, it is possible to perform using commercially available ones such as H Lamp, D Lamp and V Lamp manufactured by Fusion System Co.

Further, ultraviolet irradiation can be performed with an ultraviolet light emitting semiconductor element such as an ultraviolet light emitting diode (ultraviolet LED) or an ultraviolet light emitting semiconductor laser.

An advantage of the imaging process in which the ultraviolet irradiation is performed by the ultraviolet light emitting diode is that it is possible to emit only the ultraviolet light containing no infrared light and having a specific wavelength region, resulting in low electric power consumption.

Furthermore, in an ink jet recording method using the ink composition of the invention, heating may be performed concurrently with or after ultraviolet light irradiation.

Heating methods include a method of heating by bringing a heat source in contact with the recording medium and a method of heating without contact with the recording medium by irradiating an infrared ray or a microwave (an electromagnetic wave having the maximum wavelength at about 2,450 MHz) or by blowing hot air.

EXAMPLES

While the present invention will be illustrated in greater detail with reference to the following Examples, the invention should not be construed as being limited thereto.

Example 1

Preparation of Ink Composition 1

To a brown sample bottle having a volume of 100 ml, there were added 59 g of N-vinylformamide (NVF, manufactured by Arakawa Chemical Industries Ltd., Beamset 770), 30 g of tripropylene glycol diacrylate (TPGDA, manufactured by Toagosei Co., Ltd, Aronix M-220), 5 g of trimethylolpropane EO adduct triacrylate (TMPEOTA, manufactured by Osaka Organic Chemical Industry Ltd., Viscoat #360), 5 g of Irgacure 1800 (manufactured by Ciba Specialty Chemicals) and 1 g of Darocur EHA (manufactured by Ciba Specialty Chemicals), followed by stirring with a magnetic stirrer for 1 hour to obtain transparent ink composition 1. The composition and viscosity (25° C.) of this ink composition 1 are shown in the following Table 2.

Example 2

Preparation of Ink Composition 2

Ink composition 2 was prepared in the same manner as with the preparation of ink composition 1 in Example 1 with the exception that NVF was substituted by isobonyl acrylate (manufactured by Osaka Organic Chemical Industry Ltd., IBXA). The composition and viscosity (25° C.) of this ink composition 2 are also shown in the following Table 2.

Example 3

Preparation of Ink Composition 3

Ink composition 3 was prepared in the same manner as with the preparation of ink composition 1 in Example 1 with the exception that NVF was substituted by phenoxyethyl acrylate (manufactured by Osaka Organic Chemical Industry Ltd., Viscoat #192). The composition and viscosity (25° C.) of this ink composition 3 are also shown in the following Table 2.

Example 4

Preparation of Ink Composition 4

To a brown sample bottle having a volume of 100 ml, there were added 25 g of NVF, 34 g of acryloyl morpholine (manufactured by Kohjin Co., Ltd., ACMO), 30 g of ethylene glycol dimethacrylate (manufactured by Kyoeisha Chemical Co., Ltd., Light Ester EG), 5 g of trimethylolpropane EO adduct triacrylate (TMPEOTA, manufactured by Osaka Organic Chemical Industry Ltd., Viscoat #360), 5 g of Irgacure 1800 (manufactured by Ciba Specialty Chemicals) and 1 g of Darocur EHA (manufactured by Ciba Specialty Chemicals), followed by stirring with a magnetic stirrer for 1 hour to obtain transparent ink composition 4. The composition and viscosity (25° C.) of this ink composition 4 are shown in the following Table 2.

Comparative Example 1

Preparation of Ink Composition 5

To a brown sample bottle having a volume of 100 ml, there were added 94 g of N-vinylformamide (NVF, manufactured by Arakawa Chemical Industries Ltd., Beamset 770), 5 g of Irgacure 1800 (manufactured by Ciba Specialty Chemicals) and 1 g of Darocur EHA (manufactured by Ciba Specialty Chemicals), followed by stirring with a magnetic stirrer for 1 hour to obtain transparent ink composition 5. The composition and viscosity (25° C.) of this ink composition 5 are shown in the following Table 2.

Comparative Example 2

Preparation of Ink Composition 6

To a brown sample bottle having a volume of 100 ml, there were added 54 g of N-vinylformamide (NVF, manufactured by Arakawa Chemical Industries Ltd., Beamset 770), 35 g of tripropylene glycol diacrylate (TPGDA, manufactured by Toagosei Co., Ltd, Aronix M-220), 5 g of trimethylolpropane EO adduct triacrylate (TMPEOTA, manufactured by Osaka Organic Chemical Industry Ltd., Viscoat #360), 5 g of Irgacure 1800 (manufactured by Ciba Specialty Chemicals) and 1 g of Darocur EHA (manufactured by Ciba Specialty Chemicals), followed by stirring with a magnetic stirrer for 1 hour to obtain transparent ink composition 6. The composition and viscosity (25° C.) of this ink composition 6 are shown in the following Table 2.

Comparative Example 3

Preparation of Ink Composition 7

To a brown sample bottle having a volume of 100 ml, there were added 54 g of N-vinylformamide (NVF, manufactured by Arakawa Chemical Industries Ltd., Beamset 770), 20 g of tripropylene glycol diacrylate (TPGDA, manufactured by Toagosei Co., Ltd, Aronix M-220), 20 g of trimethylolpropane EO adduct triacrylate (TMPEOTA, manufactured by Osaka Organic Chemical Industry Ltd., Viscoat #360), 5 g of Irgacure 1800 (manufactured by Ciba Specialty Chemicals) and 1 g of Darocur EHA (manufactured by Ciba Specialty Chemicals), followed by stirring with a magnetic stirrer for 1 hour to obtain transparent ink composition 7. The composition and viscosity (25° C.) of this ink composition 7 are shown in the following Table 2.

Comparative Example 4

Preparation of Ink Composition 8

To a brown sample bottle having a volume of 100 ml, there were added 40 g of N-vinylformamide (NVF, manufactured by Arakawa Chemical Industries Ltd., Beamset 770), 40 g of tripropylene glycol diacrylate (TPGDA, manufactured by Toagosei Co., Ltd, Aronix M-220), 14 g of trimethylolpropane EO adduct triacrylate (TMPEOTA, manufactured by Osaka Organic Chemical Industry Ltd., Viscoat #360), 5 g of Irgacure 1800 (manufactured by Ciba Specialty Chemicals) and 1 g of Darocur EHA (manufactured by Ciba Specialty Chemicals), followed by stirring with a magnetic stirrer for 1 hour to obtain transparent ink composition 8. The composition and viscosity (25° C.) of this ink composition 8 are shown in the following Table 2.

Examples 5 to 20 and Comparative Examples 5 to 20

Examples 5 to 20 and Comparative Examples 5 to 20 all relate to colored ink compositions each containing a coloring material and a dispersant, and respective ink compositions were each prepared based on the preparation of the compositions in Examples 1 to 4 and Comparative Examples 1 to 4 described above, except for adding the coloring material and the dispersant.

Of these, Examples 5 to 8 and Comparative Examples 5 to 8 relate to black ink compositions, Examples 9 to 12 and Comparative Examples 9 to 12 relate to cyan ink compositions, Examples 13 to 16 and Comparative Examples 13 to 16 relate to magenta ink compositions, and Examples 17 to 20 and Comparative Examples 17 to 20 relate to yellow ink compositions. The composition and viscosity (25° C.) of the respective ink compositions are shown in the following Table 3 for the above-mentioned black ink composition, in the following Table 4 for the above-mentioned cyan ink composition, in the following Table 5 for the above-mentioned magenta ink composition and in the following Table 6 for the above-mentioned yellow ink composition, respectively.

For the respective ink compositions of Examples 1 to 20 and Comparative Examples 1 to 20 described above, the following "print test" and "curing experiment" were performed, and the results of evaluation thereof are shown in Tables 2 to 6.

Print Test

Utilizing an ink jet printer, PM-G900, manufactured by Seiko Epson Corporation, solid pattern printing was performed on a recording medium (OHP film: XEROX FILM <unframed> manufactured by Fuji Xerox Co., Ltd. was used) at ordinary temperature and ordinary pressure using each ink composition described above, and printing and curing treatment were performed at the same time by means of an ultraviolet irradiation equipment installed at a delivery port under such curing conditions as to give an integrated light amount of 90 mJ/cm$^2$. The print and curability were visually evaluated. Evaluation indices are shown below:

Evaluation Indices

A: A solid pattern was formed without the occurrence of dot omission and black spots around line image.

B: Dot omission and black spots around line image occurred during printing.

Curing Experiment

Each ink composition described above was dropped onto a glass substrate, and irradiated by using irradiation apparatus prepared using (NS365L-5CLA, manufactured by Nitride Co., Ltd.) and (NICHIA i-LED "NCCU033", manufactured by Nichia Corporation), respectively, which are ultraviolet light emitting diodes having a peak wavelength of 365 nm, so as to give an irradiation intensity at an irradiated surface of 4 mW/cm$^2$ and 20 mW/cm$^2$, respectively. Then, the irradiation time (seconds) requiring for curing was measured to evaluate curability. The evaluations of the curability (cured states) are shown below:

Cured States

A: Completely cured (practical use level).

B: Cured. A surface gets somewhat scratched when rubbed (practical use level).

C: Cured. A surface is roughened by curing contraction.

The results thereof are indicated in "curing test" columns of Tables 2 to 6 as "irradiation time requiring for curing (s: seconds)/cured state".

TABLE 2

Transparent Ink Composition

| Composition | | | Ex. 1 | Ex. 2 | Ex. 3 | Ex. 4 | Comp. Ex. 1 | Comp. Ex. 2 | Comp. Ex. 3 | Comp. Ex. 4 |
|---|---|---|---|---|---|---|---|---|---|---|
| Monomer | Monofunctional | N-Vinylformamide | 59 | | | 25 | 94 | 54 | 54 | 40 |
| | | Acryloyl Morpholine | | | | 34 | | | | |
| | | Phenoxyethyl Acrylate | | | 59 | | | | | |
| | | Isobonyl Acrylate | | 59 | | | | | | |
| | Bifunctional | Tripropylene Glycol Diacrylate | 30 | 30 | 30 | | | 35 | 20 | 40 |
| | | Ethylene Glycol Dimethacrylate | | | | 30 | | | | |
| | Multifunctional | Trimethylolpropane EO Adduct Triacrylate | 5 | 5 | 5 | 5 | | 5 | 20 | 14 |
| Polymerization Initiator | | Irgacure 1800 | 5 | 5 | 5 | 5 | 5 | 5 | 5 | 5 |
| Polymerization Accelerator | | Darocur EHA | 1 | 1 | 1 | 1 | 1 | 1 | 1 | 1 |
| Viscosity (mPa · S) | | | 8.3 | 7.1 | 7.3 | 9.7 | 4.3 | 15.6 | 21.5 | 18.6 |
| Print Test by Ink Jet Printer | | | A | A | A | A | A | B | B | B |
| Curing Test (Using Irradiation Apparatus Having an Irradiation Efficiency of 4 mW/cm$^2$) | | | 15s/A | 60s/B | 45s/B | 45s/B | 180s/C | 15s/A | 10s/A | 12s/A |
| Curing Test (Using Irradiation Apparatus Having an Irradiation Efficiency of 20 mW/cm$^2$) | | | 3s/A | 12s/B | 9s/B | 9s/B | 36s/C | 3s/A | 2s/A | 2s/A |

TABLE 3

Black Ink Composition

| Composition | | | Ex. 5 | Ex. 6 | Ex. 7 | Ex. 8 | Comp. Ex. 5 | Comp. Ex. 6 | Comp. Ex. 7 | Comp. Ex. 8 |
|---|---|---|---|---|---|---|---|---|---|---|
| Monomer | Monofunctional | N-Vinylformamide | 59 | | | 25 | 90.3 | 50.3 | 50.3 | 36.3 |
| | | Acryloyl Morpholine | | | | 34 | | | | |
| | | Phenoxyethyl Acrylate | | | 59 | | | | | |
| | | Isobonyl Acrylate | | 59 | | | | | | |
| | Bifunctional | Tripropylene Glycol Diacrylate | 26.3 | 26.3 | 26.3 | | | 35 | 20 | 40 |
| | | Ethylene Glycol Dimethacrylate | | | | 26.3 | | | | |
| | Multifunctional | Trimethylolpropane EO Adduct Triacrylate | 5 | 5 | 5 | 5 | | 5 | 20 | 14 |
| Polymerization Initiator | | Irgacure 1800 | 5 | 5 | 5 | 5 | 5 | 5 | 5 | 5 |
| Polymerization Accelerator | | Darocur EHA | 1 | 1 | 1 | 1 | 1 | 1 | 1 | 1 |
| Coloring Material | | Pigment Black-7 | 3 | 3 | 3 | 3 | 3 | 3 | 3 | 3 |
| Dispersant | | Polyoxyalkylenepoly-alkylenepolyamine | 0.7 | 0.7 | 0.7 | 0.7 | 0.7 | 0.7 | 0.7 | 0.7 |
| Viscosity (mPa · S) | | | 8.5 | 7.4 | 7.5 | 9.7 | 4.5 | 15.9 | 21.8 | 18.8 |
| Print Test by Ink Jet Printer | | | A | A | A | A | A | B | B | B |
| Curing Test (Using Irradiation Apparatus Having an Irradiation Efficiency of 4 mW/cm$^2$) | | | 18s/A | 65s/B | 50s/B | 50s/B | 180s/D | 18s/A | 12s/A | 14s/A |
| Curing Test (Using Irradiation Apparatus Having an Irradiation Efficiency of 20 mW/cm$^2$) | | | 6s/A | 15s/B | 12s/B | 12s/B | 36s/D | 6s/A | 4s/A | 4s/A |

TABLE 4

Cyan Ink Composition

| Composition | | | Ex. 9 | Ex. 10 | Ex. 11 | Ex. 12 | Comp. Ex. 9 | Comp. Ex. 10 | Comp. Ex. 11 | Comp. Ex. 12 |
|---|---|---|---|---|---|---|---|---|---|---|
| Monomer | Monofunctional | N-Vinylformamide | 59 | | | 25 | 90.3 | 50.3 | 50.3 | 36.3 |
| | | Acryloyl Morpholine | | | | 34 | | | | |
| | | Phenoxyethyl Acrylate | | | 59 | | | | | |
| | | Isobonyl Acrylate | | 59 | | | | | | |
| | Bifunctional | Tripropylene Glycol Diacrylate | 26.3 | 26.3 | 26.3 | | | 35 | 20 | 40 |
| | | Ethylene Glycol Dimethacrylate | | | | 26.3 | | | | |

TABLE 4-continued

Cyan Ink Composition

| Composition | | | Ex. 9 | Ex. 10 | Ex. 11 | Ex. 12 | Comp. Ex. 9 | Comp. Ex. 10 | Comp. Ex. 11 | Comp. Ex. 12 |
|---|---|---|---|---|---|---|---|---|---|---|
| | Multifunctional | Trimethylolpropane EO Adduct Triacrylate | 5 | 5 | 5 | 5 | | 5 | 20 | 14 |
| Polymerization Initiator | | Irgacure 1800 | 5 | 5 | 5 | 5 | 5 | 5 | 5 | 5 |
| Polymerization Accelerator | | Darocur EHA | 1 | 1 | 1 | 1 | 1 | 1 | 1 | 1 |
| Coloring Material | | Pigment Blue-15:3 | 3 | 3 | 3 | 3 | 3 | 3 | 3 | 3 |
| Dispersant | | Polyoxyalkylenepoly-alkylenepolyamine | 0.7 | 0.7 | 0.7 | 0.7 | 0.7 | 0.7 | 0.7 | 0.7 |
| Viscosity (mPa·S) | | | 8.3 | 7.4 | 7.5 | 9.7 | 4.3 | 15.6 | 21.5 | 18.6 |
| Print Test by Ink Jet Printer | | | A | A | A | A | A | B | B | B |
| Curing Test (Using Irradiation Apparatus Having an Irradiation Efficiency of 4 mW/cm²) | | | 16s/A | 65s/B | 48s/B | 48s/B | 180s/D | 17s/A | 12s/A | 14s/A |
| Curing Test (Using Irradiation Apparatus Having an Irradiation Efficiency of 20 mW/cm²) | | | 6s/A | 15s/B | 10s/B | 10s/B | 36s/D | 5s/A | 4s/A | 4s/A |

TABLE 5

Magenta Ink Composition

| Composition | | | Ex. 13 | Ex. 14 | Ex. 15 | Ex. 16 | Comp. Ex. 13 | Comp. Ex. 14 | Comp. Ex. 15 | Comp. Ex. 16 |
|---|---|---|---|---|---|---|---|---|---|---|
| Monomer | Monofunctional | N-Vinylformamide | 59 | | | 25 | 90.1 | 50.1 | 50.1 | 36.1 |
| | | Acryloyl Morpholine | | | | 34 | | | | |
| | | Phenoxyethyl Acrylate | | | 59 | | | | | |
| | | Isobonyl Acrylate | | 59 | | | | | | |
| | Bifunctional | Tripropylene Glycol Diacrylate | 26.1 | 26.1 | 26.1 | | | 35 | 20 | 40 |
| | | Ethylene Glycol Dimethacrylate | | | | 26.1 | | | | |
| | Multifunctional | Trimethylolpropane EO Adduct Triacrylate | 5 | 5 | 5 | 5 | | 5 | 20 | 14 |
| Polymerization Initiator | | Irgacure 1800 | 5 | 5 | 5 | 5 | 5 | 5 | 5 | 5 |
| Polymerization Accelerator | | Darocur EHA | 1 | 1 | 1 | 1 | 1 | 1 | 1 | 1 |
| Coloring Material | | Pigment Blue-15:3 | 3 | 3 | 3 | 3 | 3 | 3 | 3 | 3 |
| Dispersant | | Polyoxyalkylenepoly-alkylenepolyamine | 0.9 | 0.9 | 0.9 | 0.9 | 0.9 | 0.9 | 0.9 | 0.9 |
| Viscosity (mPa·S) | | | 8.3 | 7.1 | 7.3 | 9.7 | 4.3 | 15.6 | 21.5 | 18.6 |
| Print Test by Ink Jet Printer | | | A | A | A | A | A | B | B | B |
| Curing Test (Using Irradiation Apparatus Having an Irradiation Efficiency of 4 mW/cm²) | | | 16s/A | 62s/B | 46s/B | 46s/B | 180s/D | 15s/A | 10s/A | 12s/A |
| Curing Test (Using Irradiation Apparatus Having an Irradiation Efficiency of 20 mW/cm²) | | | 4s/A | 14s/B | 10s/B | 10s/B | 36s/C | 3s/A | 2s/A | 2s/A |

TABLE 6

Yellow Ink Composition

| Composition | | | Ex. 17 | Ex. 18 | Ex. 19 | Ex. 20 | Comp. Ex. 17 | Comp. Ex. 18 | Comp. Ex. 19 | Comp. Ex. 20 |
|---|---|---|---|---|---|---|---|---|---|---|
| Monomer | Monofunctional | N-Vinylformamide | 59 | | | 25 | 90.4 | 50.4 | 50.4 | 36.4 |
| | | Acryloyl Morpholine | | | | 34 | | | | |
| | | Phenoxyethyl Acrylate | | | 59 | | | | | |
| | | Isobonyl Acrylate | | 59 | | | | | | |
| | Bifunctional | Tripropylene Glycol Diacrylate | 26.4 | 26.4 | 26.4 | | | 35 | 20 | 40 |
| | | Ethylene Glycol Dimethacrylate | | | | 26.4 | | | | |
| | Multifunctional | Trimethylolpropane EO Adduct Triacrylate | 5 | 5 | 5 | 5 | | 5 | 20 | 14 |
| Polymerization Initiator | | Irgacure 1800 | 5 | 5 | 5 | 5 | 5 | 5 | 5 | 5 |
| Polymerization Accelerator | | Darocur EHA | 1 | 1 | 1 | 1 | 1 | 1 | 1 | 1 |
| Coloring Material | | Pigment Blue-15:3 | 3 | 3 | 3 | 3 | 3 | 3 | 3 | 3 |
| Dispersant | | Polyoxyalkylenepoly-alkylenepolyamine | 0.6 | 0.6 | 0.6 | 0.6 | 0.6 | 0.6 | 0.6 | 0.6 |
| Viscosity (mPa·S) | | | 8.5 | 7.4 | 7.6 | 9.9 | 4.6 | 16.0 | 21.9 | 18.9 |
| Print Test by Ink Jet Printer | | | A | A | A | A | A | B | B | B |
| Curing Test (Using Irradiation Apparatus Having an Irradiation Efficiency of 4 mW/cm²) | | | 16s/A | 64s/B | 47s/B | 47s/B | 180s/D | 15s/A | 11s/A | 14s/A |
| Curing Test (Using Irradiation Apparatus Having an Irradiation Efficiency of 20 mW/cm²) | | | 5s/A | 14s/B | 11s/B | 11s/B | 36s/D | 3s/A | 3s/A | 3s/A |

As apparent from Tables 2 to 6, in Examples 1 to 20 according to the invention, each ultraviolet curing ink composition was cured on the OHP film in a thin film form in the print test by the ink jet printer, and cured for a short irradiation time also in the curing experiment to obtain the results to be satisfied. However, in Comparative Examples 1 to 20, the insufficient results were obtained in both the print test and the curing experiment. In particular, ones using NVF as the monofunctional monomer were more excellent in curability while maintaining preferable viscosity.

While the present invention has been described in detail and with reference to specific embodiments thereof, it will be apparent to one skilled in the art that various changes and modifications can be made therein without departing from the spirit and scope thereof.

This application is based on Japanese patent application Nos. 2004-286866 (filed Sep. 30, 2004) and 2004-370203 (filed Dec. 21, 2004), the contents thereof being herein incorporated by reference.

The invention claimed is:

1. An ink composition comprising a monofunctional monomer at a mixing ratio of 50 to 70% by weight, a bifunctional monomer at a mixing ratio of 26.1 to 30% by weight and a multifunctional monomer at a mixing ratio of 1 to 10% by weight, said monofunctional monomer comprising at least N-vinylformamide, wherein the composition has a viscosity of less than 10 mPa·s at 25° C., the composition is solventless and, when deposited on a recording medium and irradiated with ultraviolet light from an ultraviolet light emitting diode, the ink composition is curable in 15 seconds or fewer when the ultraviolet irradiation is carried out at an irradiation intensity of 20 mW/cm$^2$.

2. The ink composition according to claim 1, wherein the composition further comprises a coloring material.

3. An imaging process comprising ejecting a droplet of the ink composition according to claim 2 to attach it onto a recording medium, and then, conducting ultraviolet irradiation with an ultraviolet light emitting diode.

4. The ink composition according to claim 1, wherein the monofunctional monomer, bifunctional monomer and multifunctional monomer each has a PII value of 2 or less.

5. An imaging process comprising ejecting a droplet of the ink composition according to claim 4 to attach it onto a recording medium, and then, conducting ultraviolet irradiation with an ultraviolet light emitting diode.

6. The ink composition according to claim 1, wherein the monofunctional monomer further comprises at least one selected from the group consisting of acryloyl morpholine, phenoxyethyl acrylate and isobonyl acrylate.

7. An imaging process comprising ejecting a droplet of the ink composition according to claim 6 to attach it onto a recording medium, and then, conducting ultraviolet irradiation with an ultraviolet light emitting diode.

8. An imaging process comprising ejecting a droplet of the ink composition according to claim 1 to attach it onto a recording medium, and then, conducting ultraviolet irradiation with an ultraviolet light emitting diode.

9. An imaging process comprising ejecting a droplet of the ink composition according to claim 1 to attach it onto a recording medium and then conducting ultraviolet irradiation with an ultraviolet light emitting diode, wherein the ultraviolet irradiation is carried out at an irradiation intensity of 20 mW/cm$^2$ or lower.

10. The ink composition according to claim 1, wherein the mixing ratio of the monofunctional monomer does not exceed 59% by weight.

11. The ink composition according to claim 1, wherein the ink composition does not include a dispersant or includes a dispersant in an amount of not more than 0.9 weight %.

12. The ink composition according to claim 11, wherein the ink composition does not include a dispersant.

13. An imaging process comprising ejecting a droplet of the ink composition according to claim 12 to attach it onto a recording medium, and then, conducting ultraviolet irradiation with an ultraviolet light emitting diode.

* * * * *